United States Patent [19]

Fujii et al.

[11] 4,142,701
[45] Mar. 6, 1979

[54] SUPPORT DEVICES FOR AUTOMOBILE ENGINE

[75] Inventors: Yuichi Fujii, Okazaki; Yasuo Suzuki, Nagoya; Rikizo Yoshikawa; Kiyokazu Seo; Katsunori Mori; Yasunobu Kikuchi, all of Toyota; Kazuo Yoshida, Inuyama, all of Japan

[73] Assignees: Tokai Rubber Industries Ltd., Komaki; Toyota Jidosha Kogyo Kabushiki Kaisha, Toyota, both of Japan

[21] Appl. No.: 778,979

[22] Filed: Mar. 18, 1977

[30] Foreign Application Priority Data

Aug. 12, 1976 [JP] Japan .............................. 51-107840[U]

[51] Int. Cl.² ............................................. F16F 15/00
[52] U.S. Cl. .................................. 248/544; 248/613; 248/632; 180/64 R
[58] Field of Search ............... 180/64 R; 248/3, 5-10, 248/15, 22, 358 R; 267/141, 153

[56] References Cited

U.S. PATENT DOCUMENTS

| | | | |
|---|---|---|---|
| 2,958,526 | 11/1960 | Ulderup et al. | 248/7 X |
| 3,028,665 | 4/1962 | Hirst | 248/10 X |
| 3,219,138 | 11/1965 | Kishline | 248/9 X |
| 3,244,386 | 4/1966 | Bourgeois | 248/9 |
| 3,556,445 | 1/1971 | Werner | 248/15 X |
| 3,679,158 | 7/1972 | Pusch | 180/64 R X |
| 3,685,772 | 8/1972 | Giaccone | 248/9 |
| 3,698,703 | 10/1972 | Hipsher | 248/10 X |
| 3,730,462 | 5/1973 | Dick | 180/64 R X |
| 3,762,671 | 10/1973 | Schulz | 180/64 R X |

Primary Examiner—Lawrence J. Staab
Attorney, Agent, or Firm—Anthony J. Casella

[57] ABSTRACT

Support devices for automobile engine comprising attaching two buffers each comprising connecting the exterior surface of a metal shaft with the interior surface of a metal hollow cylinder arranged so as to surround the shaft in spaced relation by means of an elastic rubber member to provide higher and lower directions of the rigidities between the shaft and the metal cylinder at a plane perpendicular to the coextensive axes of the shaft and the metal cylinder in horizontal relation with respect to the coextensive direction of the shaft and the metal cylinder and connecting one end of either the shaft or the metal cylinder with the car body and another end thereof with the engine so that the coextensive line of the direction having higher rigidity intersects with a vertical plane through the center of gravity of the engine at a position below the intersection of the coextensive line directed to the direction having lower rigidity with the above-mentioned vertical plane to support symmetrically the engine on the car body in a laterally spaced relation, thereby eliminating the heavy noises generated by the operation of the automobile engine and preventing the separation of the engine from the car body.

6 Claims, 5 Drawing Figures

SUPPORT DEVICES FOR AUTOMOBILE ENGINE

BACKGROUND OF THE INVENTION

1. Field of the Invention

The present invention relates to devices for supporting an automobile engine on a car body.

2. Description of the Prior Art

In general, a number of buffers C each comprising a rubber block $C_1$ sandwiched between and attached adhesively to metal plates $C_2$, $C_3$ as sketched in FIG. 1 has been employed conventionally for supporting an automobile engine A on a car body at the front and rear sides and at the right and left sides thereof. Metal place $C_2$ of buffer C is attached to an upwardly inclined protrusion of the car body B and another metal plate $C_3$ is attached to engine A to support it in position. In such a support, engine A is supported so that the vertical plane D—D through the center of gravity of engine A intersects upwardly and obliquely with the main axis of buffer C, i.e., with direction E—E of block C having a higher rigidity. Hence, the downward exciting force owing to the vibration of engine A will be composed of a downward component and a component an outward direction, i.e., the reverse direction to the engine and the upward exciting force will be composed of an upward component and a component to an inward direction, i.e., the reverse direction to the engine, resulting in enhancing the vibration. In certain car bodies, however, a secondary vibration may be additionally induced perpendicularly to each component due to the inherent anisotropy of the car bodies and the primary and secondary vibrations of each component are overlapped synergetically to a large vibration to be resulted in a resonance of the car bodies in a particular revolution range of the engine to cause loud heavy noise. Since such a buffer is kept undetachably to engine A and carbody B in such a buffer wherein a rubber block $C_1$ is sandwiched between and adhered to metal plates $C_2$, $C_3$ by the vulcanization, either metal plate $C_2$ or $C_3$ may be stripped off from block C to tend to detach engine A from car body B when the car body is accidentally inverted.

SUMMARY OF THE INVENTION

It is a primary object of the present invention to provide supporting devices of an automobile engine which overcome the foregoing disadvantages encountered in conventional supports.

It is another object of the present invention to provide supporting devices for automobile engines which eliminate loud and heavy noise by directing the components of the exciting force applied to the buffers due to the vibration of the engine to a direction different from the conventional one.

It is a further object of the present invention to provide supporting devices for an automobile engine in which the engine is not detached from the car body when the rubber block is accidentally stripped off from the metal plates.

According to the present invention, each of the support devices for supporting an automobile engine comprises a buffer composed of a metal shaft, a metal hollow cylinder arranged so as to surround in spaced relation to the periphery of the shaft and a precompressed elastic rubber member provided in the space between the interior surface of the metal cylinder and the exterior surface of the metal shaft and defining directions having higher and lower rigidities between the shaft and metal cylinder at a plane perpendicular to the longitudinal direction of the shaft; and a mechanism for connecting the buffer with a car body and an engine. The connecting mechanisms are installed at both lateral sides of the car body in symmetric relation so that the coextensive line to the direction having the high rigidity intersects with a vertical plane through the center of gravity of the engine at a position below the intersection of the coextensive line to the direction having the lower rigidity with the vertical plane.

DETAILED DESCRIPTION OF PREFERRED EMBODIMENTS

Figure 1:
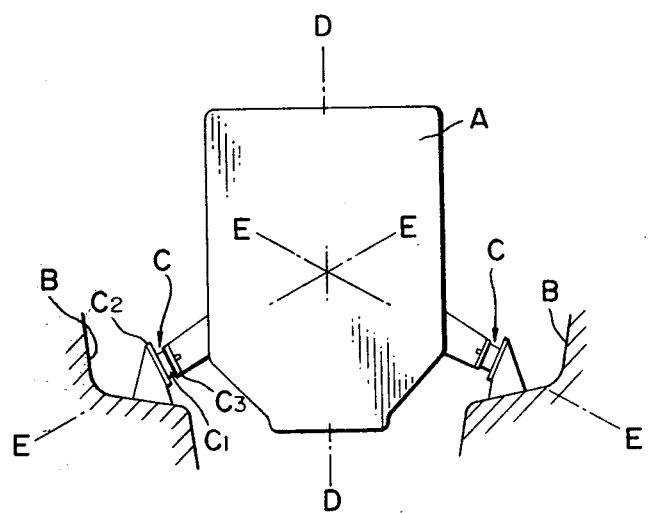
FIG. 1 illustrates a front view of a prior art device for supporting an automobile engine.
Figure 3:
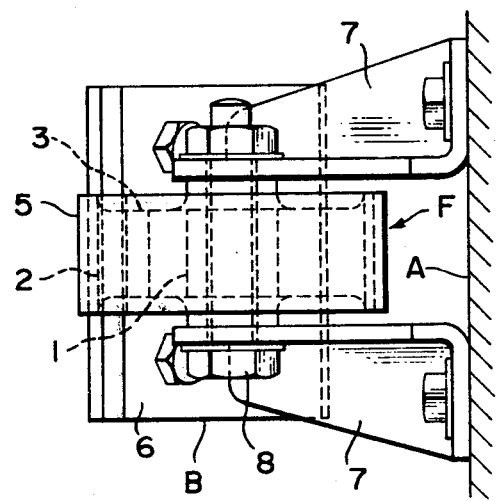
FIG. 3 illustrates a plan view of the embodiment shown in FIG. 2.

In the attached drawings, buffer F comprises mainly a metal shaft 1, a metal hollow cylinder 2 arranged so as to surround the periphery of shaft 1 in spaced relation and an elastic rubber member 3 for connecting the exterior surface of shaft 1 and the interior surface of metal cylinder 2. Elastic rubber member is provided suitably with a plurality of holes 4 perforated through the member at directions parallel to the longitudinal axis of shaft 1 to provide two main elastic axes intersecting perpendicularly to each other at the near the center of metal cylinder between shaft 1 and metal cylinder 2 on a plane perpendicular to the coextensive direction of the axes of shaft 1 and metal cylinder 2 and having different elastic constants.

After elastic rubber member 3 has been adhered to shaft 1 and metal cylinder 2 by vulcanization, the metal cylinder is drawn longitudinally to enhance the durability of rubber member 3 and a sheath 5 is closely fitted through the periphery of metal cylinder 2 to keep elastic rubber member 3 under compressed condition.

Figure 4:
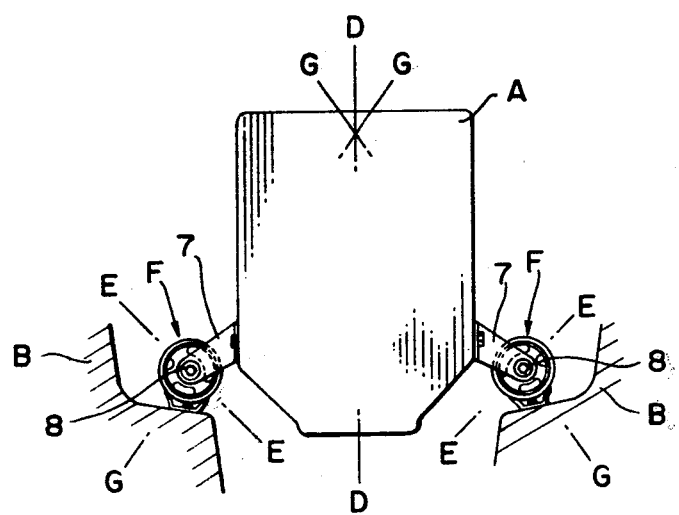
FIG. 4 is a front view illustrating an embodiment of the device for supporting an automobile engine according to the present invention.

Sheath 5 is attached with brackets 6 to be mounted on car body B and engine A by welding so that direction E—E having the higher rigidity intersects with vertical plane D—D through the center of gravity of engine A at a lower position that the intersection of direction G—G having the lower rigidity with vertical plane D—D and shaft I is connected to engine A by means of a bolt 8 fitted forcedly through shaft 1 and brackets 7, as shown in FIG. 4.

Figure 2:
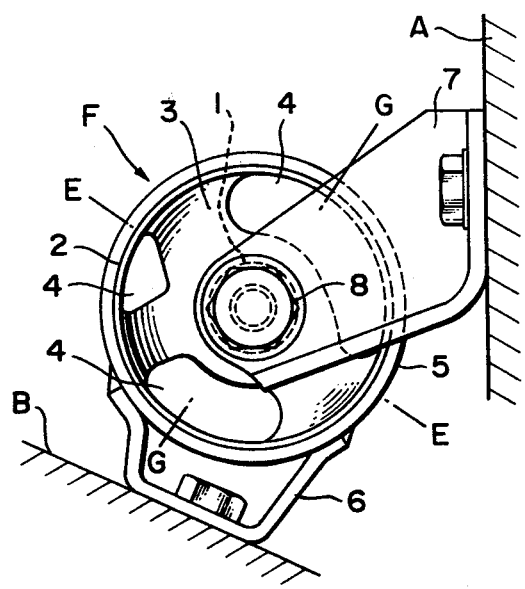
FIG. 2 illustrates an enlarged front view of an embodiment of the buffer for supporting an automobile engine according to the present invention.
Figure 2A:
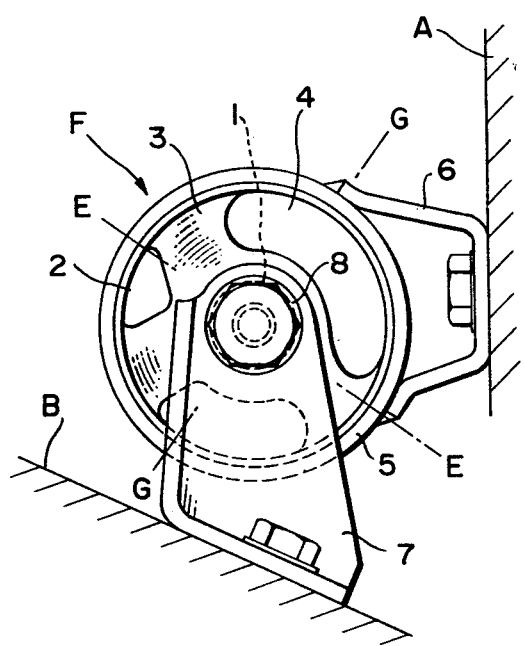
FIG. 2A illustrates a similar view of another embodiment of the buffer according to the present invention.

Alternatively, shaft 1 may be connected to car body B and sheath 5 to engine A provided that direction E—E having the higher rigidity intersects with vertical plane D—D through the center of gravity of engine A at a lower position than the intersection of direction G—G with vertical plane D—D as shown in FIG. 2A.

Moreover, elastic rubber member which is provided with a plurality of optional holes may be replaced by a combination of independently formed rubber blocks.

As a result of such a structure as disclosed hereinbefore, the downward exciting force due to vibrations of engine A introduces a downward component and an inward component with respect to the car body and the upward exciting force an upward component and an outward component with respect to the car body at buffer F so that the primary vibrations due to such components and the second vibrations due to the anisotropy inherent to the car body are sinergetically reduced to make the resultant vibration to be reduced. Hence, while the vibrations due to the rotation of the engine is transferred to the car body, the resonance of the car body can be prevented so that it can be prevented that the noise becomes loud suddenly when the number of revolution of the engine reaches to an inherent value.

Even though the elastic rubber member were accidentally stripped off between the shaft connected directly to the engine and the sheath connected to the car body, the engine is not detached from the car body due to the fact that the shaft is arranged in the metallic cylinder and both of the ends of the shaft are attached to the brackets to provide highly and safely supports for automobile engine.

What we claim is:

1. Devices for supporting an automobile engine comprising a buffer composed of a metal shaft, a metal hollow cylinder arranged so as to surround said shaft in spaced relation and an elastic rubber member provided under compressed condition between the interior surface of said metal cylinder and the exterior surface of said shaft, said elastic rubber member having three leg portions, two of which are in opposed relationship, for forming directions having higher and lower rigidities between said shaft and said metal cylinder at a plane perpendicular to the longitudinal axis of said buffer; and means for connecting said buffers to the engine and to a car body, said means for connecting each buffer being attached so that the coextensive line to the direction having said higher rigidity extends through said two opposed leg portions and intersects the vertical plane through the center of gravity of said engine at a position below the intersection of the coextensive direction having said lower rigidity with said vertical plane, and said buffers being attached symmetrically to the car body in laterally spaced relation.

2. The devices according to claim 1 wherein each of said connecting means comprises brackets for connecting said shaft with the engine and brackets for connecting said metal cylinder with the car body.

3. The devices according to claim 1 wherein each of said connecting means comprises brackets for connecting said shaft with the car body and brackets for connecting directly said metal cylinder with the engine.

4. The devices according to claim 1 wherein said elastic rubber member has a plurality of perforated holes parallel to the longitudinal axis of said buffer.

5. The devices according to claim 1 wherein said elastic rubber member is attached adhesively between the interior surface of said metal cylinder and the exterior surface of said shaft by the vulcanization.

6. The devices according to claim 1 further comprising a sheath fitted forcedly on the exterior surface of said metal cylinder.

* * * * *